US012686513B2

(12) United States Patent
Prozer et al.

(10) Patent No.: US 12,686,513 B2
(45) Date of Patent: Jul. 21, 2026

(54) CONTAINER FIXING DEVICE FOR PHARMACEUTICAL CONTAINERS, WEIGHING STATION AND APPARATUS FOR PROCESSING PHARMACEUTICAL CONTAINERS

(71) Applicant: Bausch + Stroebel SE + Co. KG, Ilshofen (DE)

(72) Inventors: Daniel Prozer, Groeningen (DE); Maren Slansky, Schwaebisch Hall (DE)

(73) Assignee: Bausch + Stroebel SE + Co. KG, Ilshofen (DE)

( * ) Notice: Subject to any disclaimer, the term of this patent is extended or adjusted under 35 U.S.C. 154(b) by 305 days.

(21) Appl. No.: 18/467,863

(22) Filed: Sep. 15, 2023

(65) Prior Publication Data

US 2024/0034493 A1     Feb. 1, 2024

Related U.S. Application Data

(63) Continuation of application No. PCT/EP2022/056706, filed on Mar. 15, 2022.

(30) Foreign Application Priority Data

Mar. 17, 2021    (DE) ..................... 10 2021 106 457.0

(51) Int. Cl.
| | |
|---|---|
| *B65B 3/00* | (2006.01) |
| *B65B 3/28* | (2006.01) |
| *G01G 17/04* | (2006.01) |

(52) U.S. Cl.
CPC ................ *B65B 3/006* (2013.01); *B65B 3/28* (2013.01); *G01G 17/04* (2013.01)

(58) Field of Classification Search
CPC ........... B65B 3/006; B65B 3/28; G01G 17/04
See application file for complete search history.

(56) References Cited

U.S. PATENT DOCUMENTS

| | | | | | |
|---|---|---|---|---|---|
| 5,137,693 | A | * | 8/1992 | Mawhirt | ................... B01L 9/06 |
| | | | | | 422/562 |
| 5,916,527 | A | * | 6/1999 | Haswell | ................... B01L 9/06 |
| | | | | | 422/549 |

(Continued)

FOREIGN PATENT DOCUMENTS

| | | |
|---|---|---|
| CN | 213812522 U | 7/2021 |
| DE | 29923418 U1 | 9/2000 |

(Continued)

OTHER PUBLICATIONS

Search Report received in International Application No. PCT/EP2022/056706 dated Jun. 29, 2022, with translation, 5 pages.

*Primary Examiner* — Natalie Huls
(74) *Attorney, Agent, or Firm* — Christopher A. Rothe; CM Law

(57) ABSTRACT

A container fixing device for pharmaceutical containers, a weighing station, and an apparatus for processing pharmaceutical containers. The container fixing device includes a main body and two or more fixing elements, each having a fixing member that can be placed onto the container, which elements are secured to the main body and between which elements an interspace is formed to accommodate a container. At least one fixing element is moveable on the main body. A container located in the interspace makes contact with an actuating member of the movable fixing element. The actuating member can transfer from a release position, in which the container can be introduced into and removed from the interspace, into a fixing position, in which the container is fixed by the fixing members. The container can (Continued)

be introduced into the interspace in a transport direction transverse to the actuation direction.

25 Claims, 9 Drawing Sheets

(56)                      References Cited

U.S. PATENT DOCUMENTS

| | | | | |
|---|---|---|---|---|
| 8,108,068 | B1 * | 1/2012 | Boucher | G01G 17/00 |
| | | | | 700/240 |
| 9,746,012 | B2 | 8/2017 | Warrick et al. | |
| 10,527,483 | B2 * | 1/2020 | Meyer | G01F 13/001 |
| 11,518,596 | B2 * | 12/2022 | Komann | B65D 25/103 |
| 12,429,372 | B2 * | 9/2025 | Chianura | G01G 17/00 |
| 2006/0137915 | A1 | 6/2006 | Luechinger | |
| 2017/0258294 | A1 | 9/2017 | Mesa et al. | |
| 2018/0229866 | A1 * | 8/2018 | Eberhardt | B65B 65/003 |
| 2020/0289371 | A1 | 9/2020 | Biehl et al. | |
| 2021/0333144 | A1 * | 10/2021 | Gabusi | G01G 21/22 |
| 2022/0244090 | A1 * | 8/2022 | Chianura | B65B 1/32 |
| 2022/0299356 | A1 * | 9/2022 | Krauss | B65B 3/003 |
| 2023/0406554 | A1 * | 12/2023 | Boerret | B65B 35/26 |
| 2024/0375808 | A1 * | 11/2024 | Boehmike | G01G 17/04 |
| 2024/0375809 | A1 * | 11/2024 | Boehmike | B65B 43/46 |

FOREIGN PATENT DOCUMENTS

| | | | | | |
|---|---|---|---|---|---|
| DE | 102011018909 | A1 | | 12/2011 | |
| DE | 102012209714 | A1 * | 12/2013 | | G01G 15/00 |
| WO | 2020075204 | A1 | | 4/2020 | |

* cited by examiner

CONTAINER FIXING DEVICE FOR PHARMACEUTICAL CONTAINERS, WEIGHING STATION AND APPARATUS FOR PROCESSING PHARMACEUTICAL CONTAINERS

CROSS-REFERENCE TO RELATED APPLICATIONS

This application is a continuation application of international application number PCT/EP2022/056706, filed on Mar. 15, 2022, and claims the benefit of German application number 10 2021 106 457.0, filed on Mar. 17, 2021, which are incorporated herein by reference in their entirety and for all purposes.

FIELD

The present disclosure relates to a container fixing device for pharmaceutical containers for use on a weighing station.

Furthermore, the present disclosure relates to a weighing station for an apparatus for processing pharmaceutical containers.

Moreover, the present disclosure relates to an apparatus for processing pharmaceutical containers.

BACKGROUND

In an apparatus for processing pharmaceutical containers, pharmaceutical containers, and in particular syringes, carpules, ampoules, and/or vials, are usually transported by means of a transport device to various processing stations. For example, the processing stations are arranged along a transport direction on the transport device. In this case, the containers, which can also be referred to as objects, are, for example, filled with a pharmaceutical substance (agent) at a filling station. The substance can, for example, be a liquid or a solid. With regard to process control, it can be provided that the containers be weighed, before filling, in order to determine the tare weight, and subsequently be weighed again, after filling, in order to determine the gross weight. Any shortfall can be replenished. Overfilled containers can be ejected. The containers can be closed at a closing station.

With the containers, a distinction can be made between stable containers and non-stable containers. Stable containers are, for example, vials or phials which can be placed in a stable manner on plate-like receptacles of the weighing station for the weighing process. In contrast, containers such as syringes, carpules, or ampoules are not, or barely, stable. It is therefore necessary to insert such containers, for example, into a sleeve that receives the containers during the weighing process. It is disadvantageous here that relatively large movements must be carried out for lowering the containers or for raising the weighing station. This increases the cycle time for the weighing process, such that the apparatus cannot be driven at the full cycle, despite possible shorter cycle times of the transport device. An accelerated movement of the containers or the scale leads does not lead to shortening of the cycle time, because the transient response of the weighing station, and thus the weighing process, is extended.

A container fixing device having a sleeve-like receptacle is described in WO 2020/075204 A1.

An object underlying the present disclosure is that of providing a container fixing device, a weighing station, and an apparatus for processing pharmaceutical containers, which enable fixing in particular non-stable containers on a weighing cell of the weighing station, preferably in order to reduce a cycle time of the weighing station.

SUMMARY

In a first aspect of the disclosure, a container fixing device disclosure for use on a weighing station is provided. The container fixing device comprises a main body for connection to or as a component of a weighing cell of the weighing station, two or more fixing elements, which are fixed on the main body, having at least one respective fixing member, which can be placed onto the container, between which an interspace for receiving a container is formed, and of which at least one fixing element is movably arranged on the main body. A container arranged in the interspace comes into contact with an actuating member of the at least one movable fixing element in the case of a relative movement with respect to the main body in an actuation direction. Said fixing element is able to be transferred from a release position, in which the container can be inserted into the interspace and can be removed therefrom, into a fixing position in which the container is fixed by means of the fixing members. The container fixing device is designed such that the container can be inserted into the interspace in a transport direction which is oriented transversely and in particular perpendicularly to the actuation direction.

In a second aspect of the disclosure, a weighing station for an apparatus for processing pharmaceutical containers is provided. The weighing station comprises at least one weighing cell and at least one container fixing device, associated therewith, in accordance with the first aspect. Preferably, a plurality of weighing cells and a plurality of container fixing devices in accordance with the first aspect are provided, wherein each weighing cell is associated with a container fixing device.

In a third aspect of the disclosure, an apparatus for processing pharmaceutical containers is provided. The apparatus comprises a transport device, wherein the containers are each held on the transport device with at least one gripping element and are transportable in a cycled manner in a defined transport direction. The apparatus further comprises at least one weighing station in accordance with the second aspect, the weighing station being arranged on the transport device. A respective container is movable in the transport direction into the interspace of a container fixing device. The weighing station and the container are transferable relative to one another in the actuation direction for transferring the at least one movable fixing element from the release position into the fixing position.

BRIEF DESCRIPTION OF THE DRAWINGS

The foregoing summary and the following description may be better understood in conjunction with the drawing figures, of which.

DETAILED DESCRIPTION

Figure 1:
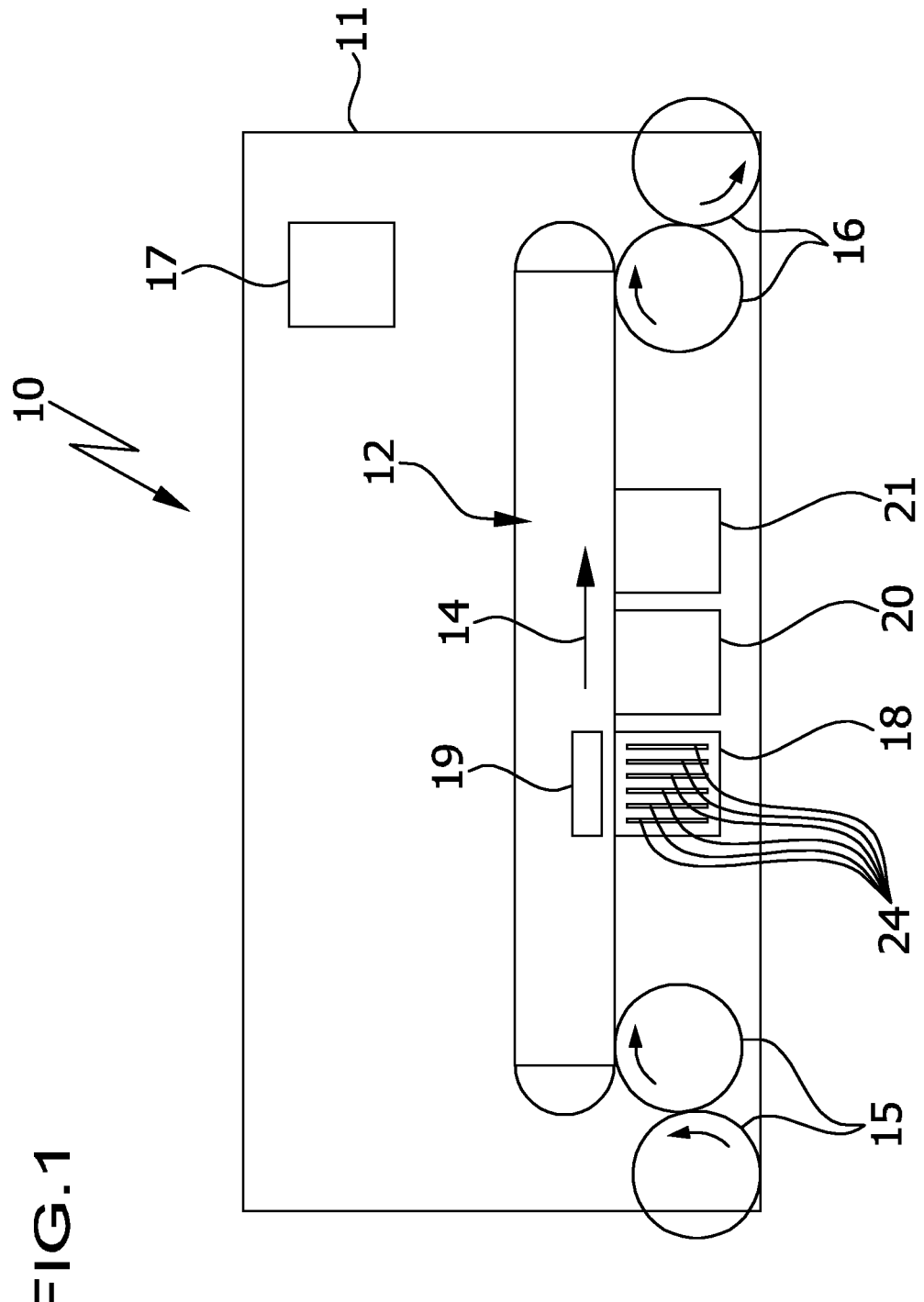
FIG. 1: is a schematic plan view of an apparatus in accordance with the disclosure for processing pharmaceutical containers, comprising a weighing station in accordance with the disclosure having container fixing devices in accordance with the disclosure.

Although the disclosure is illustrated and described herein with reference to specific embodiments, the disclosure is not intended to be limited to the details shown. Rather, various modifications may be made in the details within the scope and range of equivalents of the claims and without departing from the disclosure.

The present disclosure relates to a container fixing device for pharmaceutical containers for use on a weighing station, comprising a main body for connection to or as a component of a weighing cell of the weighing station, two or more fixing elements, which are fixed on the main body, having at least one respective fixing member, which is adapted to be placed onto the container, between which a interspace for receiving a container is formed, and of which at least one fixing element is movably arranged on the main body, wherein a container arranged in the interspace comes into contact with an actuating member of the at least one movable fixing element in the case of a relative movement with respect to the main body in an actuation direction, and said fixing element is transferable from a release position, in which the container is insertable into the interspace and is removable therefrom, into a fixing position in which the container is fixed by means of the fixing members, wherein the container fixing device is designed such that the container is insertable into the interspace in a transport direction which is oriented transversely and in particular perpendicularly to the actuation direction.

The container fixing device in accordance with the disclosure can be fixed via the main body to the weighing cell of the weighing station. Alternatively, the weighing cell can form the main body. An interspace is formed between two or more fixing elements of the container fixing device. At least one fixing element can be transferred from a release position into a fixing position in which the container is fixed by the fixing elements by means of the fixing members. The moving fixing element is moved by a relative movement of the container and the main body. In this case, the container can contact an actuating member of the at least one movable fixing element, in order to transfer it into the fixing position. In the transport direction, which is specified for example by a transport device, the container can be inserted into the interspace transversely and in particular perpendicularly to the actuation direction. This preferably makes it possible to design the relative movement of the container and the main body for the fixing process so as to be as short as possible. In particular, in comparison with, for example, sleeve-shaped container fixing devices of the background art, it is not necessary to move the container over the entire length of the sleeve. As a result of the thus reduced range of motion for actuating the container fixing device, excessive acceleration of the container can be reduced, associated with a short transient response of the weighing station and, as a result, an increased cycle of the weighing station.

The following statements relate to an intended use of the container fixing device, the weighing station, and the apparatus for processing the containers. In this case, the weighing process is carried out by means of gravity, wherein the weighing cell is arranged below the container in relation to the direction of gravity. Position and orientation information such as "below," "above," or the like refer to the use as intended. The actuation direction is preferably oriented along a height direction and in particular a vertical, and the transport direction preferably along a horizontal.

In the present case, "container" can in particular comprise not only the actual vessel receiving the pharmaceutical substance, but also any components arranged thereon in connection with the usual administration of the container. For example, in the case of syringes, the container can also comprise the needle guard usually attached via the syringe needle, which is designed to be cap-shaped, for example. In the case of carpules, the container can also comprise, for example, the crimping cap arranged on one side.

It can be provided that the weighing cell, and in particular the weighing station, be able to be raised. For example, the container fixing device can be raised in the direction of the container arranged in the interspace, wherein the actuating member contacts a lower end or a lower end portion of the container. In this case, the orientation of the actuation direction is in particular vertically upwards.

Alternatively, it can be provided that the container be able to be lowered. For example, the container arranged in the interspace can be lowered in the direction of the actuating member, wherein a lower end or a lower end portion of the container contacts the actuating member of the at least one movable fixing element. The orientation of the actuation direction is in particular vertically downwards.

It can, for achieving a structurally simple embodiment, be provided that the container fixing device comprise exactly two fixing elements. The fixing elements are preferably directly opposite one another in relation to the interspace.

It may be favorable if the container fixing device comprises only one movable fixing element. This proves advantageous, for example, for a structurally simple embodiment.

Alternatively or in addition, it can be provided for the container fixing device to comprise at least one immovable fixing element. This can prove advantageous for a structurally simple configuration.

In a preferred embodiment of the disclosure, the container fixing device comprises a movable and an immovable fixing element, and preferably no further fixing element.

In a different preferred embodiment of the disclosure, the container fixing device can comprise, for example, two movable fixing elements, and preferably no further fixing element.

At least two fixing elements are preferably configured identically, with a view to a structurally simple configuration.

It can be advantageous if at least two movable fixing elements are configured and arranged symmetrically with respect to one another in relation to a central plane, containing the transport direction, of the container fixing device.

It is, advantageously, provided that the container be able to be centered in the interspace by the fixing elements, in that the at least one movable fixing element is transferred into the fixing position. In this way, the position of the container is clearly defined. This is advantageous, for example, when a filling element of the filling station engages in the container, for the purpose of filling, while said container is located on the weighing station.

For the container fixing device in accordance with the disclosure, the container can be inserted into the interspace in the transport direction, as mentioned above. It can be provided, for example, that the container be able to be moved out of the interspace, counter to the transport direction, when the at least one movable fixing element assumes the release position.

However, it is advantageous if the container can be moved out of the interspace in the transport direction. This provides, for example, the possibility of arranging the weighing station on a transport device having an, in particular, linear transport direction. The containers are inserted into the interspace in the transport direction, weighed—possibly filled and weighed again—and further guided out of the interspace in the transport direction.

It may accordingly be favorable if the container can pass through the container fixing device in the transport direction. This proves to be advantageous, for example, for a multi-stage weighing station, when supplying and removing the containers.

On the main body, at least one through-opening is preferably formed, through which the container can be introduced into the interspace in the transport direction.

Advantageously, on the main body, two through-openings are formed, through which the container can be introduced into and removed from the interspace.

In the last-mentioned advantageous embodiments, it is, expediently, not necessary to guide the entire container through the at least one through-opening. For example, only a portion of the container, e.g., a lower portion of the container, is guided through the through-opening. This can be sufficient, for example, when the container and/or the fixing elements project(s) beyond the main body in the height direction.

The two through-openings are preferably opposite one another along the transport direction.

The two or more fixing elements are preferably spaced apart from one another to such an extent that, when the release position of the movable fixing element is assumed, the interspace is large enough that the container or a container portion can be inserted into the interspace or removed therefrom. In this case, the container or the container portion is preferably free of contact with the fixing elements.

The main body preferably comprises two or more holding portions, which are each arranged at a distance from one another and on which a fixing element is arranged in each case. For example, each fixing element is associated with a holding portion. The holding portions can define the interspace, at least in portions, for example, and/or the above-mentioned at least one through-opening can be arranged between spaced holding portions.

In a plan view along the transport direction, the main body is formed, for example, so as to be substantially U-shaped.

For example, the main body comprises a base element and holding portions spaced apart from one another, each forming a limb of the U.

The holding portions each comprise, for example, two holding segments, in particular, spaced apart from one another in the transport direction, between which a fixing element is arranged and on which the fixing element is movably or immovably fixed.

The fixing elements can project beyond the holding portions, and in particular upwards in a height direction. Alternatively, the holding portions can, for example, be the same length or substantially the same length, in the height direction, as the fixing elements.

In a preferred embodiment, the main body comprises a, for example, plate-shaped or disc-shaped base portion, from which the holding portions protrude and/or on which a connecting element is arranged for connecting to a weighing cell. The holding portions protrude, for example, upwards from the base portion, in particular, in the vertical direction.

The main body is connected to the weighing cell by means, for example, of force-locking and/or positive-locking connection. A catch mechanism can be provided, for example.

At least one fixing element can be detachably connectable to the main body.

At least one fixing element can be fixed to the main body in a non-detachable manner.

It can be provided that at least one fixing element be integrally connected to the main body or formed by the main body.

It is advantageous if the at least one movable fixing element is mounted on the main body so as to be pivotable about a pivot axis. In this way, a reliable function of the container fixing device can be ensured. A compact design of the container fixing device is preferably achieved in this case. This proves to be expedient, for example, in order to allow a sufficiently small distance of adjacent containers from one another ("pitch") in the transport device, in particular, in the case of a plurality of weighing cells and container fixing devices.

The pivot axis is preferably oriented in parallel with the transport direction. For example, the movable fixing element is pivoted in a plane which is oriented perpendicularly to the transport direction.

The at least one movable fixing element is preferably articulated at a distal end of the holding portion, wherein "distal" refers to the above-mentioned base portion.

The at least one movable fixing element preferably forms a two-armed lever, which comprises a first lever arm comprising the fixing member, and a second lever arm comprising the actuating member. The pivot axis is preferably arranged between the actuating member and the fixing member.

It can be provided that the first lever arm be designed so as to be longer than the second lever arm.

The actuating member and the fixing member are advantageously arranged on end portions, facing away from one another, of the fixing element.

It is expedient if the actuating member, in the release position of the at least one movable fixing element, comprises or forms a run-on surface oriented obliquely to the actuation direction. Due to the relative movement, the container can contact the run-on surface and bring about the pivoting of the fixing element.

In a preferred embodiment, the at least one movable fixing element comprises a set-back portion, which is arranged between the actuating member and the fixing member and connects these, and in the region of which the fixing element is set back with respect to the interspace, in comparison with the actuating member and with the fixing member. In particular, the interspace is widened at the set-back portion, on which, for example, the pivot axis is arranged.

The fixing elements preferably have a longitudinal extension.

Alternatively or in addition, the fixing elements are designed, for example, in the shape of a strip or finger.

In the fixing position, the container preferably rests on the actuating member in the fixing position of the at least one movable fixing element. This secures in particular the fixing element in the fixing position.

By means of a relative movement counter to the actuation direction, the container can preferably be removed from the actuating member in order to enable the return movement of the fixing element to the release position.

It is advantageous if the main body comprises a recess in which the container engages in the state fixed by means of the container fixing device. This makes it possible to ensure a defined position of the container in the container fixing device. This can be advantageous in particular when the container is to be filled at the weighing station.

The container preferably engages in the recess in a positive-locking manner.

The recess is, for example, in the form of a blind hole.

It is advantageous if the fixing member of at least one fixing element comprises a concave recess, in which the container engages in the fixing position of the at least one movable fixing element. The recess is preferably matched to the shape and/or the size of the container. In this way, reliable fixing of the container can be ensured, which is surrounded laterally by the fixing member, for example.

It is advantageous if the fixing member of at least one fixing element is, by means of a preloading element, preloaded in the direction of the container arranged in the interspace. The container can be acted upon with a fixing force via the preloading element, and is reliably fixed in this way.

The preloading element is, for example, a compression spring which rests on a support member of the fixing element and on the fixing member, in order to apply a force, directed on the container, to the fixing member. For example, the preloading element is a coil spring.

For example, a receptacle for the fixing member is formed on the fixing element, or the fixing element comprises such a receptacle. Advantageously, the fixing member and the preloading element are arranged in the receptacle, which forms a guide for the fixing member, wherein the fixing member engages through an opening of the receptacle and projects in the direction of the container. For example, the fixing member can be displaced under the action of or counter to the action of the preloading element, and, in the process, protrude to different extents from the receptacle.

It can be advantageous if the fixing element has a receptacle body which comprises or forms the receptacle and which is displaceably guided on a holding portion of the main body and is coupled to a pivot portion, which is pivotably mounted on the holding portion, of the fixing element and is displaced by the fixing element, relative to the main body, when the pivot portion is pivoted. When the movable fixing element is pivoted, the receptacle body is displaced together with the fixing member arranged thereon. It is found that, in this way, in particular, reliable fixing of the container can be achieved. The pivot portion is coupled to the receptacle body, for example, by means of a joint which comprises, for example, a bearing element that engages in a slot. The pivoting movement of the fixing element can in this way be converted into an, in particular, linear displacement of the receptacle body on the holding portion.

A displacement direction of the receptacle body is oriented in particular perpendicularly to the actuation direction and/or perpendicularly to the transport direction.

It is advantageous if the at least one movable fixing element is automatically transferred from the fixing position into the release position during a relative movement of the container and of the main body counter to the actuation direction. In order to release the container, the aforementioned relative movement is reversed. As a result, the contact of the container with the actuating element is preferably released, and the actuating member is automatically transferred from the fixing position into the release position. This takes place in particular under the influence of gravity.

It can be provided that a preferably immovable fixing element comprise a fixing member having two fixing portions which are spaced apart from one another in an extension direction of the container, wherein a preferably movable fixing element comprises a fixing element which is arranged, in relation to the extension direction, between the fixing portions.

An immovable fixing element is oriented, for example, in parallel with the actuation direction and/or in a height direction.

In a preferred embodiment of the disclosure, the container fixing device comprises interacting coupling elements at two or more fixing elements in each case, in order to couple the fixing elements to one another in the release position, in particular, in a contactless manner, wherein the fixing elements are transferred from the release position into the fixing position, counter to the action of the coupling elements. The coupling elements are designed, for example, to provide a coupling force between the fixing elements. A movable fixing element can be secured in this way in the release position, and only when actuated by the container is the fixing element transferred into the fixing position.

The coupling elements preferably are or comprise magnetic elements on the fixing elements, counter to the magnetic force of which the at least one movable fixing element is transferred from the release position into the fixing position.

For example, the magnetic elements are arranged in a respective receptacle of the fixing element, which can be closed by a cover element.

The magnetic elements can be pressed, injected, or cast into the fixing element.

The coupling elements, in particular, the magnetic elements, are preferably arranged in the region of an end portion, facing the base portion of the main body, of the fixing elements, for example, at the height of the actuating member.

The container fixing device comprises, on the main body, a stop element, preferably formed separately from a fixing element, which the at least one movable fixing element strikes in the release position. In this way, the release position of the movable fixing element is clearly defined.

The container fixing device is advantageously configured such that the moved mass of the at least one movable fixing element is as small as possible.

The container fixing device is preferably configured to be pharmaceutical-compatible, for example, for use in an atmosphere for protection and/or for decontamination purposes of an isolator device of the apparatus for processing containers.

As mentioned at the outset, the present disclosure also relates to a weighing station.

A weighing station in accordance with the disclosure for an apparatus for processing pharmaceutical containers comprises at least one weighing cell and at least one container fixing device, associated therewith, of the type described above, wherein preferably a plurality of weighing cells and a plurality of container fixing devices of the type described above are provided, wherein each weighing cell is associated with a container fixing device.

The weighing cells and the container fixing devices are preferably arranged laterally next to one another along the transport direction, and are uniformly spaced apart from one another.

As further mentioned at the outset, the present disclosure also relates to an apparatus.

An apparatus in accordance with the disclosure for processing pharmaceutical containers comprises a transport device, wherein the containers are each held on the transport device with at least one gripping element and are able to be transported in a cycled manner in a defined transport direction, and at least one weighing station of the type described above arranged on the transport device, wherein a respective container is movable in the transport direction into the interspace of a container fixing device, and the weighing station and the container are transferable relative to one another in the actuation direction for transferring the at least one movable fixing element from the release position into the fixing position.

The advantages that were already mentioned in connection with the explanation of the container fixing device in accordance with the disclosure can also be achieved in the case of the weighing station in accordance with the disclosure and in the case of the apparatus in accordance with the disclosure. In this regard, reference can be made to the above statements. Advantageous embodiments of the weighing station in accordance with the disclosure and the apparatus in accordance with the disclosure follow from advantageous embodiments of the container fixing device in accordance with the disclosure. In this regard, too, reference can be made to the above statements.

In the apparatus, the containers can be inserted into the interspace in the transport direction and weighed in the fixed state. Preferably, a filling station for filling the containers is provided at the weighing station. Preferably, tare weighing and gross weighing are carried out with a view to 100% process control (IPC).

It is understood that the apparatus in accordance with the disclosure can preferably comprise a control device which can control all the processes. In the present case, "control" can mean, in particular, "control and/or regulate."

Expediently, the containers are inserted into the interspace in the transport direction and, after the weighing process, are guided out of said interspace again in the transport direction. This allows the possibility of through-transport through the container fixing device with at least one interim weighing process and preferably a filling process.

The at least one gripping element gripping the container can preferably be transferred into an open position that releases the container, if the container is fixed to the container fixing device. Only when the container is reliably fixed is the gripping element released, with a view to increased process reliability.

The weighing station preferably comprises, along the transport direction, a plurality of weighing cells and a plurality of container fixing devices, wherein a preferably corresponding plurality of containers are supplied in a cycled manner to the container fixing devices and weighed at the same time at the weighing station. The weighing station can accordingly be designed in a multi-position manner, wherein it is possible for the number of positions of the weighing cells and container fixing devices to correspond to the number of positions of the containers to be processed.

The container fixing device of the weighing station can in particular be what is known as a "format part," which is matched to the quality of the container to be processed. In this way, the weighing station can be converted when different containers are to be processed.

In the case of the apparatus for processing pharmaceutical containers, it can be provided that a weighing station be used, by means of which the tare weight and the gross weight of the containers are determined. In such an apparatus, only one weighing station, for example, is provided. The containers are preferably filled by means of the filling station while they are located on the weighing station. It can be provided that the gross weight be determined during the filling process.

It may be provided that the apparatus comprise a first weighing station for determining the tare weight and a second weighing station for determining the gross weight of the containers. The weighing stations are arranged, for example, one behind the other along the transport direction. The filling station is designed, for example, to fill the containers between the weighing stations. It is, advantageously, provided that the containers be filled during transport from the first weighing station to the second weighing station. Any missing filling amounts can be replenished, for example, while the containers are held at the second station by means of the container fixing device.

disclosure disclosure FIG. 1 is a schematic view of an advantageous embodiment of the apparatus in accordance with the disclosure for processing containers, which embodiment is, overall, assigned the reference numeral 10. The apparatus 10 is shown in plan view, and comprises a transport device 12 on a frame 11. The transport device 12 is a revolving transport device in which containers 13, for processing, can be transported along an in particular straight transport direction 14.

The containers 13 can be fed to the transport device 12 via coupling elements 15, for example, transport wheels. The processed containers 13 can be removed from the transport device 12 by decoupling elements 16, for example, transport wheels.

The apparatus 10 comprises, overall, a control device 17, which controls all processes of the apparatus 10.

Several processing stations for processing the containers 13 are arranged on the transport device 12.

The processing stations comprise a weighing station 18, which is a preferred embodiment of the weighing station in accordance with the disclosure.

Furthermore, the processing stations comprise a filling station 19, which in the present case is arranged on the weighing station 18, as well as, arranged downstream of these two stations, in the transport direction 14, a closing station 20 for closing filled containers 13, and a control station 21 for follow-up checks of the closed containers 13.

The processing stations can also be referred to as processing devices, for example, as a weighing device, filling device, closing device, etc.

In the case of the apparatus 10, it is possible to weigh the containers 13 at the weighing station 18 and, in the process, to determine the unfilled weight (tare weight). The containers 13 can be filled at the weighing station 18 via the filling station 19. The weight of filled containers 13 (gross weight) can also be checked at the weighing station 18 and can be refilled if necessary. Overfilled containers 13 can be ejected later, for example.

In the present example, a liquid pharmaceutical substance is filled into the containers 13. Filling elements, e.g., needles, of the filling station 19 can engage in the containers 13 for this purpose.

In particular, a 100% process control (IPC) can be carried out in the case of the apparatus 10.

The disclosure is explained below using the example of containers 13 in the form of syringes 22. However, the disclosure is not limited to this. The disclosure can also be used, for example, with other types of containers 13, in particular, carpules and/or ampoules. An application of the disclosure with containers 13 in the form of vials is also conceivable.

In the present case, the syringe 22 comprises a cap-shaped needle guard for protecting the syringe needle. The needle guard is considered a component of the container 13.

The disclosure is advantageous in particular in connection with non-stable containers such as syringes, carpules, and/or ampoules.

The transport device 12 is a cycled transport device in which a plurality of containers 13 are moved stepwise. In the present case, these are six containers 13, wherein it is possible for their number to also be different. A respective processing station is configured for cycled processing of the plurality of containers 13.

Figure 2:
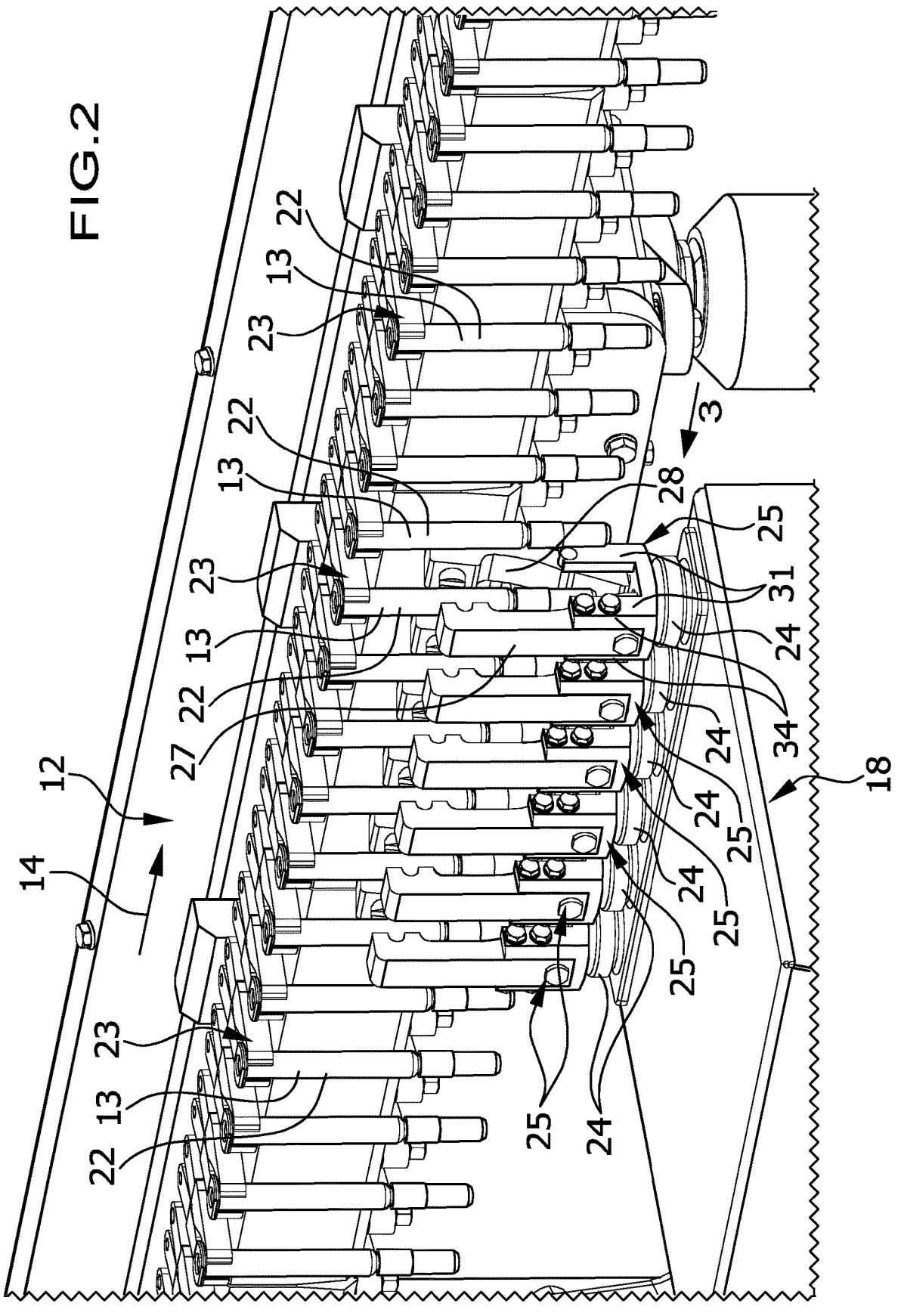
FIG. 2: is a perspectival partial view of the apparatus from FIG. 1, in which the weighing station is shown in part, with container fixing devices on a transport device.

As can be seen in particular from FIG. 2, the transport device 12 comprises, for each container 13, a gripping element 23, which can be transferred in a targeted manner into an open position by means of actuation by the control device 17, in order to release the container 13. Conversely, the gripping element 23 can be transferred to a closed position in order to grip and transport the container 13.

The gripping elements 23 are gripping tongs, which in the present case comprise two branches which are movable relative to one another.

Along the transport direction 14, the weighing station 18 comprises several weighing cells 24 (FIGS. 1 and 2), corresponding to the number of positions.

The weighing station 18 further comprises a plurality of the container fixing device 25 in accordance with the disclosure in a preferred embodiment, corresponding to the number of positions. A container fixing device 25 is associated with a respective weighing cell 24.

The container fixing devices 25 are arranged along the transport direction 14 and are uniformly spaced apart from one another. This distance preferably corresponds to the distance between adjacent gripping elements 23 on the transport device 12, referred to as the "pitch."

In the case of cycled transport, the containers 13 are supplied to the container fixing devices 25, weighed, filled, weighed again, and subsequently removed from the container fixing devices 25, according to the number of positions in the transport direction 14. This is discussed below.

The first preferred embodiment 25 of the container fixing device in accordance with the disclosure is described below with reference to FIGS. 2 through 8. Further preferred embodiments subsequently follow. Like or functionally equivalent features and components are used with the same reference numerals. Only the essential differences of the different embodiments are discussed. The explanations given in connection with the container fixing device 25, and advantages achievable therewith, apply in a corresponding manner for the other container fixing devices.

The container fixing device 25 comprises a main body 26, and in the present case two fixing elements 27, 28 for fixing the container 13. The main body 26 has a plate-shaped or disc-shaped base portion 29. A connecting element 30 for detachably connecting to the weighing cell 24 is arranged on the base portion 29. The connecting element 30 can be inserted in a positive-locking manner into a receptacle of the weighing cell 24 (not shown in the drawing) and latched therein.

In this way, the container fixing device 25, which can in particular be a "format part," can be replaced, depending upon the containers 13 to be processed. The apparatus 10 can preferably comprise several format sets having container fixing devices 25 matched to the respective containers 13.

The main body 26 comprises two holding portions 31, wherein each holding portion 31 is associated with a fixing element 27 or 28. The holding portions 31 protrude upwards from the base portion 29 in the height direction, in particular, in the vertical direction. A respective holding portion 31 has a distal end 32, relative to the base portion 29.

The holding portions 31 are spaced apart from one another such that through-openings 33 are formed on the main body 26, between the holding portions 31. In the present case, there are two through-openings 33 which are spaced apart from one another in the transport direction 14, i.e., in particular, "front" and "rear" in the transport direction 14.

Each holding portion 31 comprises two holding segments 34 which are spaced apart from one another in the transport direction 14. A respective fixing element 27, 28 is arranged between the holding segments 34, and in the present case engages positively between the holding segments 34.

In this case, in a plan view along the transport direction 14, the main body 26 is substantially U-shaped. The holding portions 31 are spaced apart from one another in a transverse direction, which is oriented to be transverse and in particular perpendicular to the transport direction 14.

A recess 35 is formed on the main body 26. In the present case, the recess 35 is arranged centrally on the base portion 29 and is in the form of a blind hole.

The fixing elements 27 and 28 differ in that the fixing element 27 is immovably fixed on one holding portion 31, whereas the fixing element 28 is movably held on the other holding portion 31.

Both fixing elements 27, 28 are substantially finger-shaped and have a fixing member 36 for fixing the container 13, which fixing member can be placed on the container 13 in order to fix it.

The fixing members 36 are arranged on the distal end portions 37 of the fixing elements 27, 28, relative to the base portion 29.

With respect to the base portion 29, the fixing elements 27, 28 have a proximal end portion 38. The end portion 38 of the fixing element 27 extends as far as the base portion 29—the end portion 38 of the fixing element 28 up to near the base portion 29.

In particular, the fixing members 36 are arranged above on the fixing elements 27, 28.

An interspace 39, which is formed so as to be variable in size as a result of the movement of the fixing element 28, is formed between the fixing elements 27, 28. The fixing elements 27, 28 lie, in relation to the interspace 39, directly opposite one another in the transverse direction.

In relation to the transport direction 14, the interspace 39 is arranged between the through-openings 33.

In the present case, the fixing elements 27, 28 are dimensioned such that they project beyond the holding portions 31 in the height direction. Thereby, the fixing elements 27, 28 are in the present case more than twice as long as the holding portions 31, wherein it is possible for this ratio to also be different. Overall, a compact design can be achieved in the case of the container fixing device 25.

The fixing element 27 is connected to the holding portion 31, for example, by screwing. In the present case, the fixing member 36 of the fixing element 27 comprises two fixing portions 40 which project into the interspace 39. The fixing portions 40 are spaced apart from one another along the height direction.

As is explained below, an actuation direction 41 of the container fixing device 25 extends in the height direction. A recess is arranged between the fixing portions 40.

The fixing element 27 is oriented to be substantially vertical in the height direction.

The movable fixing element 28 is mounted on the holding portion 31 so as to be pivotable about a pivot axis 42. The pivot axis 42 extends in parallel with the transport direction 14, and, in the present case, in particular perpendicularly to the actuation direction 41. A bearing element for mounting the fixing element 28 is arranged at the distal end 32 of the holding portion 31.

In this way, the fixing element 28 forms a two-armed lever having a first lever arm 43, which comprises the fixing member 36, and a second lever arm 44. In the present case, the lever arm 43 is longer than the lever arm 44. The lever arm 43 is arranged above the lever arm 44.

The fixing element 28 comprises an actuating member 45—in the present case, at the end portion 38, and thus on the second lever arm 44. The actuating member 45 and the fixing member 36 are arranged on opposite sides of the pivot axis 42.

The actuating element 45 comprises a run-on surface 46 (FIGS. 3 and 5) extending, in a release position of the fixing element 28, obliquely with respect to the actuation direction 41. At the actuating member 45, the fixing element 28 widens in the direction of the fixing element 27, with narrowing of the interspace 39.

The fixing element 28 has, arranged between the actuating member 45 and the fixing member 36, a set-back portion 47 in the region of which the fixing element 28 is set back relative to the interspace 39 in comparison with the actuating member 45 and with the fixing member 36. In the region of the set-back portion 47, the interspace 39 is widened. A corresponding set-back portion 47 is also formed on the fixing element 27.

Figures 5, 6:
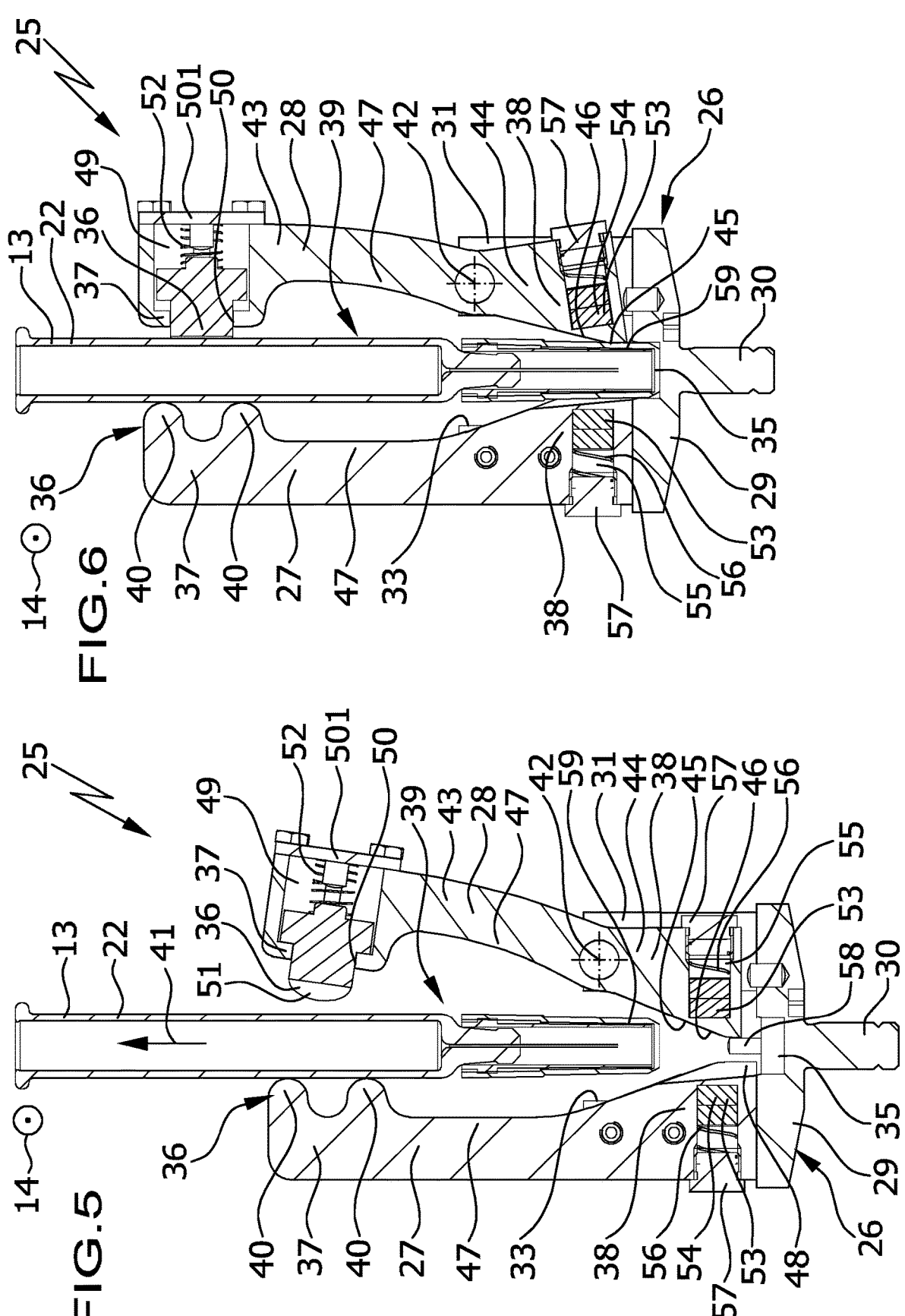
FIGS. 5 and 6: are longitudinal sectional views according to FIGS. 3 and 4 of the container fixing device and with the transport device faded out.

In the present case, the fixing element 27 does not comprise an actuating member at the end portion 38, but a recess 48 (FIGS. 5 and 6).

Due to the shape of the fixing elements 27, 28, the interspace expands, starting from the end portions 38, in the height direction, and then narrows again in the region of the fixing members 36.

In the case of the fixing element 28, the fixing member 36 is arranged in a receptacle 49 on the end portion 37. The receptacle 49 forms a guide for the fixing member 36, which extends through an opening 50. In this case, the fixing member 36 projects into the interspace 39 in the direction of the container 13. The receptacle is, by means of a cover element 501, closed on the opposite side.

The portion of the fixing member 36 arranged outside the receptacle 49 comprises a concave recess 51. The recess 51 is matched to the container 13 in terms of shape and size. The container 13 can engage in the recess 51 in particular in a positive-locking manner, wherein the fixing member 36 laterally surrounds the container 13.

The fixing member 36 can be displaced in the receptacle 49 counter to the action of a preloading element 52. The preloading element 52 is designed as a compression spring in the form of a coil spring, supported on the cover element 501 as a supporting member, and acts upon the fixing member 36 with a preload force directed in the direction of the interspace 39 and the container 13. The fixing member 36 is pushed further into the receptacle 49, counter to the preload force. Corresponding stops on the edge of the receptacle 49 and on the fixing member 36 define the displacement path of the fixing member 36 under the effect of the preload force.

As can be seen in particular from FIGS. 5 and 6, the fixing elements 27, 28 comprise coupling elements 53. Via the coupling elements 53, the fixing elements 27, 28 can couple in a contactless manner, and in particular when the fixing element 28 assumes the release position, as explained below.

In the present case, the coupling elements 53 are interacting magnetic elements 54, wherein at least one magnetic element 54 is arranged on each end portion 38.

In each case, a receptacle 55 for the magnetic element 54 (in the present case, two pieces in each case) is formed in the end portion 38. The magnetic elements 54 are arranged in a positive-locking manner in the receptacle 55 and are subjected to a preload force, by means of a preloading element 56, in the direction of the other fixing element 27, 28 in each case. A cover element 57, designed in the present case as a plug, closes the receptacle 55.

The preloading elements 56 are in the present case compression springs, designed as coil springs.

The magnetic elements 54 on the fixing elements 27, 28 are thus polarized opposite to one another in such a way that the end portions 38 are pulled towards one another as a result of the magnetic force. Conversely, the end portions 38 can be separated from one another counter to the magnetic force, in the case of a movement of the fixing element 28.

A stop element 58 for movable fixing element 28 is arranged on the main body 26, in the present case, on the base portion 29, in order to limit its pivoting movement in the direction of the fixing element 27 (in relation to the end portions 38). The stop element 58 is arranged along the transport direction 14 laterally next to the recess 54, such that it is free towards the top (FIG. 5).

In the case of the apparatus 10, a relative movement of the container 13 and of the main body 26 can be triggered in order to bring the fixing element 28 for holding the container 13 on the container fixing device 25 from a release position into a fixing position. In this case, it is possible to move the container fixing device 25 by raising the weighing station 18. In the present case, this movement is indicated in the drawing by the actuation direction 41.

It is understood that the relative movement could also be caused by the possibility of lowering the container 13 in an actuation direction, and then, with a different orientation, in the direction of the container fixing device 25.

In both cases, the relative movement in the actuation direction leads to the container 13 being able to contact the actuating element 45.

The mode of operation of the container fixing device 25 is explained below.

The containers 13, supplied in a cycled manner, can be inserted into the respective interspace 39 in the transport direction 14, and then assume the position shown in FIGS. 2, 3, 5, and 7 on the container fixing devices 25. In this case, it is advantageous that the containers 13 can be guided through the container fixing device 25 in the transport direction 14. This allows the possibility of inserting a container 13 into the container fixing device 25 associated therewith, through container fixing devices 25 that are arranged upstream in the transport direction 14 in each case.

In the present case, the container 13 can also be inserted into the interspace 39 in that the container 13 can be guided through the through-opening 33 by a lower container portion 59. This offers the advantage, for example, that the container fixing device 25 can be positioned as close as possible to the container 13, in order to keep the relative movement as small as possible.

In the present case, the container portion 59 is formed by the needle guard of the container 13. However, the disclosure is not limited to this.

Initially, the fixing elements 27, 28 assume such a distance from one another that the interspace 39 is free for supplying the container 13. In this case, the fixing element 28 assumes a release position. The magnetic elements 54 couple such that the fixing element 28 is held in the release position, while abutting against the stop element 58.

In the height direction, the lower end of the container 13 is still arranged above the actuating member 45 (FIGS. 3 and 5) and is preferably free of contact therewith.

By moving the weighing station 18 in the actuation direction 41 (or, alternatively, the container 13 in the opposite direction), in the present case, the lower end of the container 13 comes into contact with the actuating element 45. The fixing member 28 is pivoted about the pivot axis 42 by this contact. The pivoting takes place against the magnetic force of the magnetic elements 54.

Figures 3, 4:
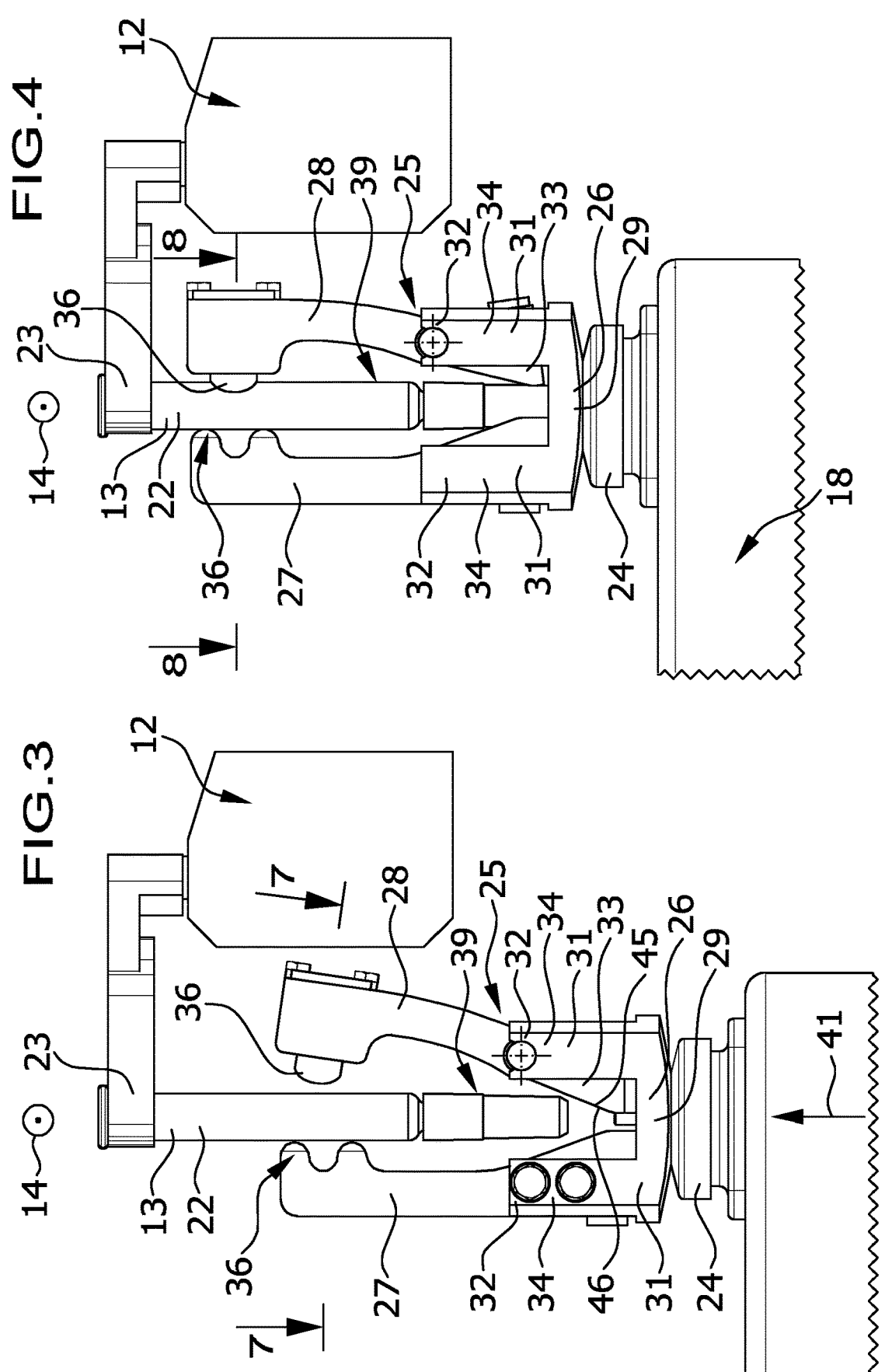
FIG. 3: is a partial view along the arrow "3" in FIG. 2, wherein a fixing element of the container fixing device assumes a release position.
FIG. 4: is a view corresponding to FIG. 3, wherein the fixing element assumes a fixing position.
Figure 8:
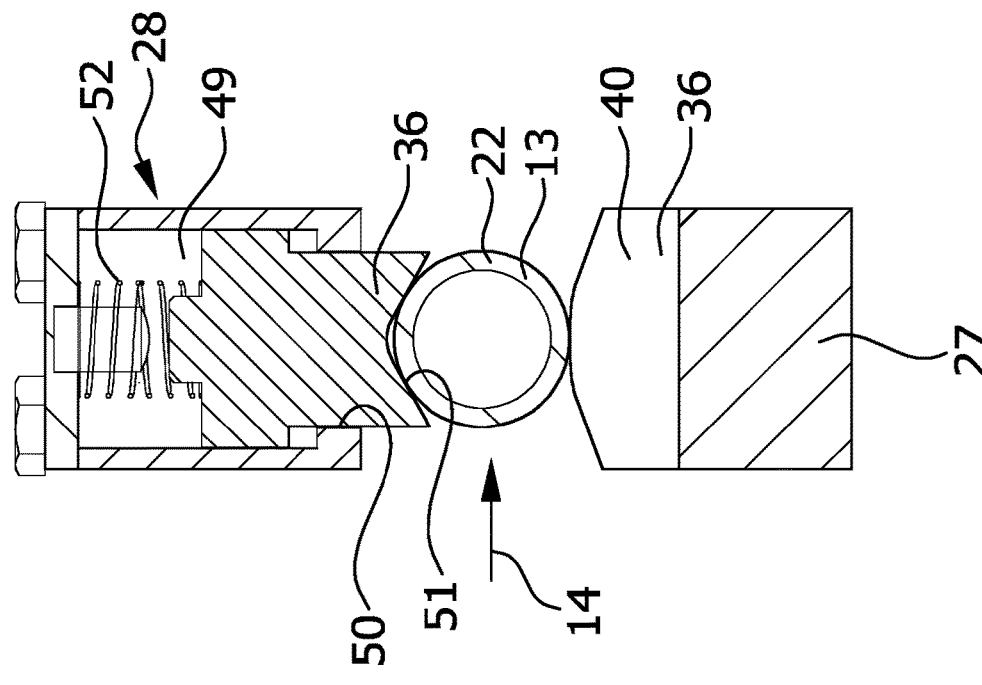
FIG. 8: is a simplified partial view along the line 8-8 in FIG. 4.
Figure 7:
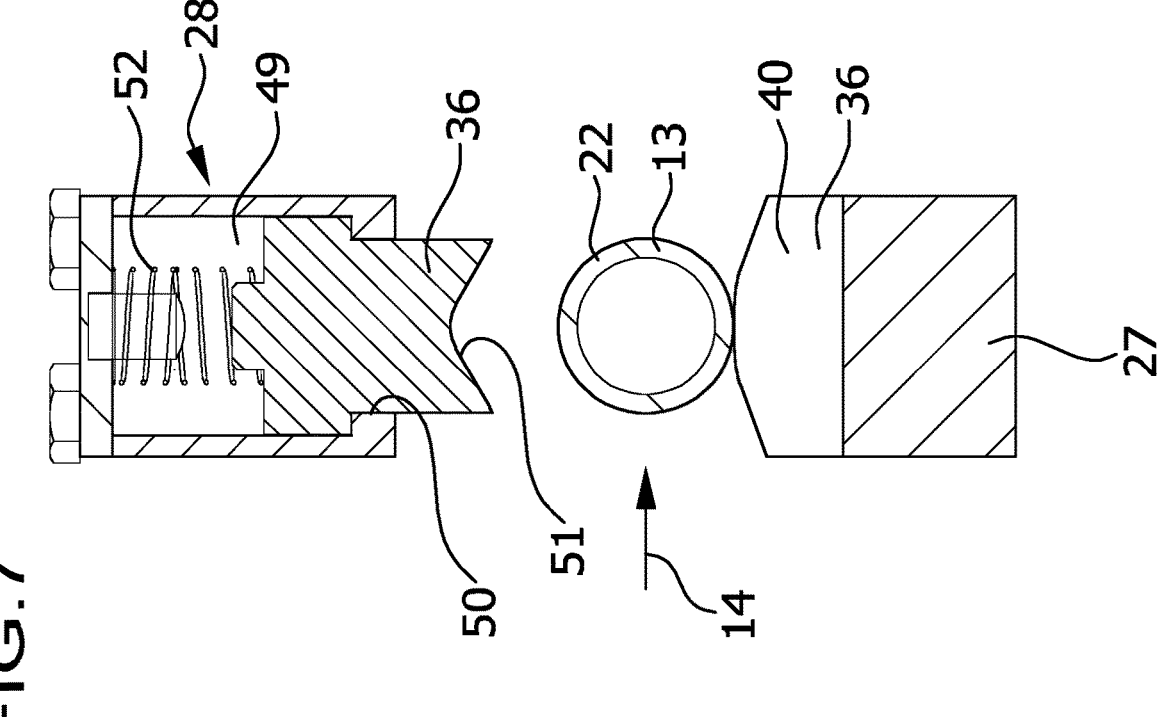
FIG. 7: is a simplified sectional view along the line 7-7 in FIG. 3.

The fixing element 28 can be pivoted up to a fixing position (FIGS. 4, 6, and 8). The fixing element 28 assumes the fixing position in particular when the weighing station 18 has been raised as far as possible. In this case, the container fixing device 25 is raised until the lower end of the container 13 engages in the recess 35. In this case, the container 13, furthermore, contacts the actuating member 45.

The container 13 engages at the bottom in the recess 48 and is free of contact with the end portion 38 of the fixing element 27.

As a result of the configuration of the fixing element 28 as a pivotable lever, the fixing member 36 of the fixing element 28 comes to rest against the container 13, which engages in the recess 51 and displaces the fixing member 36 counter to the preload force of the preloading element 52.

At the same time, the container 13 comes to rest against the fixing member 36 of the fixing element 27. The fixing member 36 of the fixing element 28 engages between the fixing portions 40, relative to the height direction. The height direction corresponds to the direction of extension of the container 13.

If the fixing element 28 assumes the fixing position, the container 13 is reliably fixed on the container fixing device 25. The recess 35 and the recess 51 allow in particular a centering.

The weighing process for determining the tare weight can be carried out. The container 13 is preferably filled by means of the filling station 19, and the weighing process for determining the gross weight is subsequently carried out.

After the last weighing process, the weighing station 18 and the container fixing device are moved relative to one another counter to the original actuation direction 41. In this case, in the present example, the weighing station 18 is lowered (or, alternatively, the container 13 is raised).

When the weighing station 18 is lowered, the fixing element 28 pivots gradually back into the release position.

The pivoting movement preferably takes place under the effect of gravity and under the magnetic force of the magnetic elements 54.

If the fixing element 28 assumes the release position, the container 13 can be transported away, out of the interspace 39, through the through-opening 33, in the transport direction 14.

During the weighing process, the gripping element 23 assumes the open position. The gripping element 23 is preferably opened only when the fixing element 28 assumes the fixing position. Conversely, the gripping element 23 is preferably closed before the weighing station 18 is lowered.

As a result of the configuration of the container fixing device 25 in accordance with the disclosure, short cycle times can be achieved in the case of the weighing station 18, as has already been explained above.

Figures 9, 10:
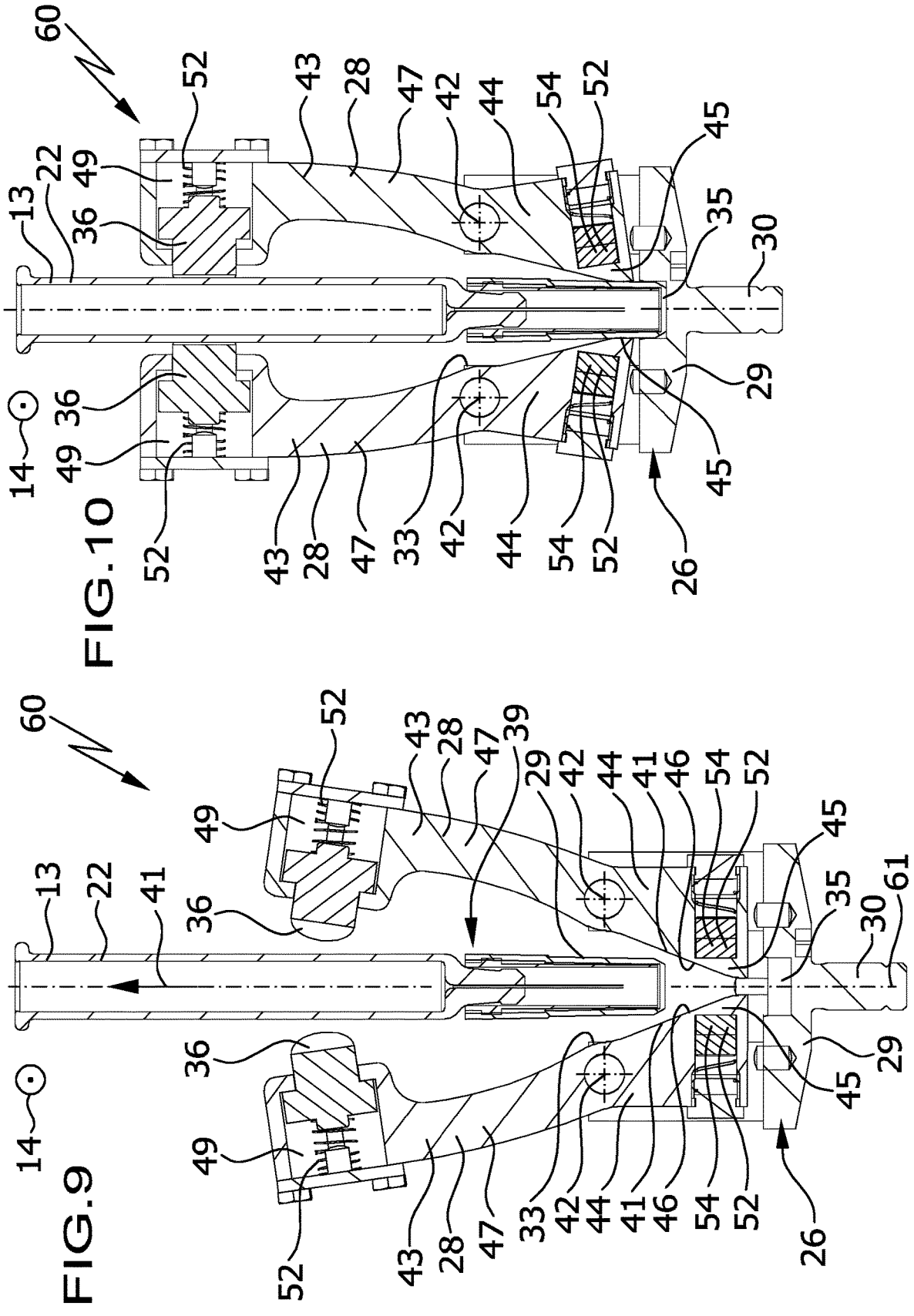
FIGS. 9 and 10: are views according to FIGS. 5 and 6 in the case of a further preferred embodiment of the container fixing device.

FIGS. 9 and 10 show advantageous embodiments, denoted by reference numeral 60, of the container fixing device in accordance with the disclosure in a manner corresponding to FIG. 5 or 6.

In the case of the container fixing device 60, two movable fixing elements 28 are provided, which can each be pivoted from a release position (FIG. 9) into a fixing position (FIG. 10).

The fixing elements 28 are designed so as to be symmetrical relative to one another in relation to a central plane 61 of the container fixing device 60, which plane contains the transport direction 14 and in the present case is a vertical plane. The fixing elements 28 are in particular identical. For the remainder, reference is made to the statements above.

FIGS. 11 through 14 show a preferred embodiment of the container fixing device in accordance with the disclosure, denoted by reference numeral 62.

As in the case of the container fixing device 60, two movable fixing elements 28 are provided in the container fixing device 62, which are preferably symmetrical relative to one another. For this reason, only one of the fixing elements 28 is discussed below.

In the case of the container fixing device 62, the holding portions 31 have a greater extension than in the above embodiments, and are substantially as long as the fixing elements 28 in the height direction. The pivot axis 42 is arranged approximately centrally in the region of the holding portions 31 and substantially centrally on the fixing elements 28.

The fixing element 28 comprises a receptacle body 63 which forms the receptacle 49 and receives the fixing member 36. The receptacle body 63 is guided displaceably in a guide portion 64 formed by the holding portion 31. In this case, the displacement direction is oriented transversely and in particular perpendicularly to the actuation direction 41 and to the transport direction 14.

Figures 11, 12:
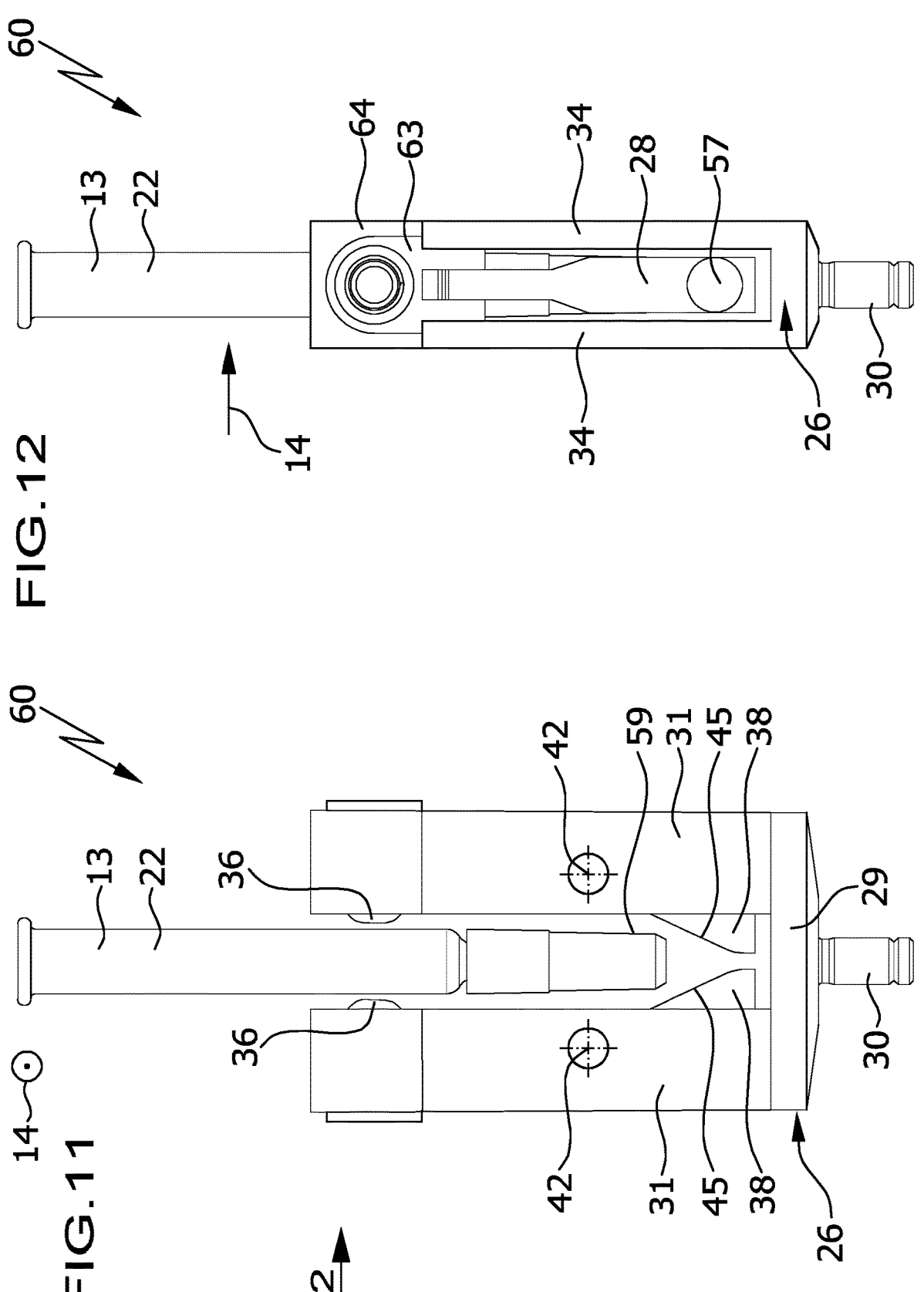
FIG. 11: is a view corresponding to FIG. 3 in the case of a further preferred embodiment of the container fixing device, with the transport device faded out.
FIG. 12: is a side view of the container fixing device, in the viewing direction of the arrow "12" in FIG. 11.
Figures 13, 14:
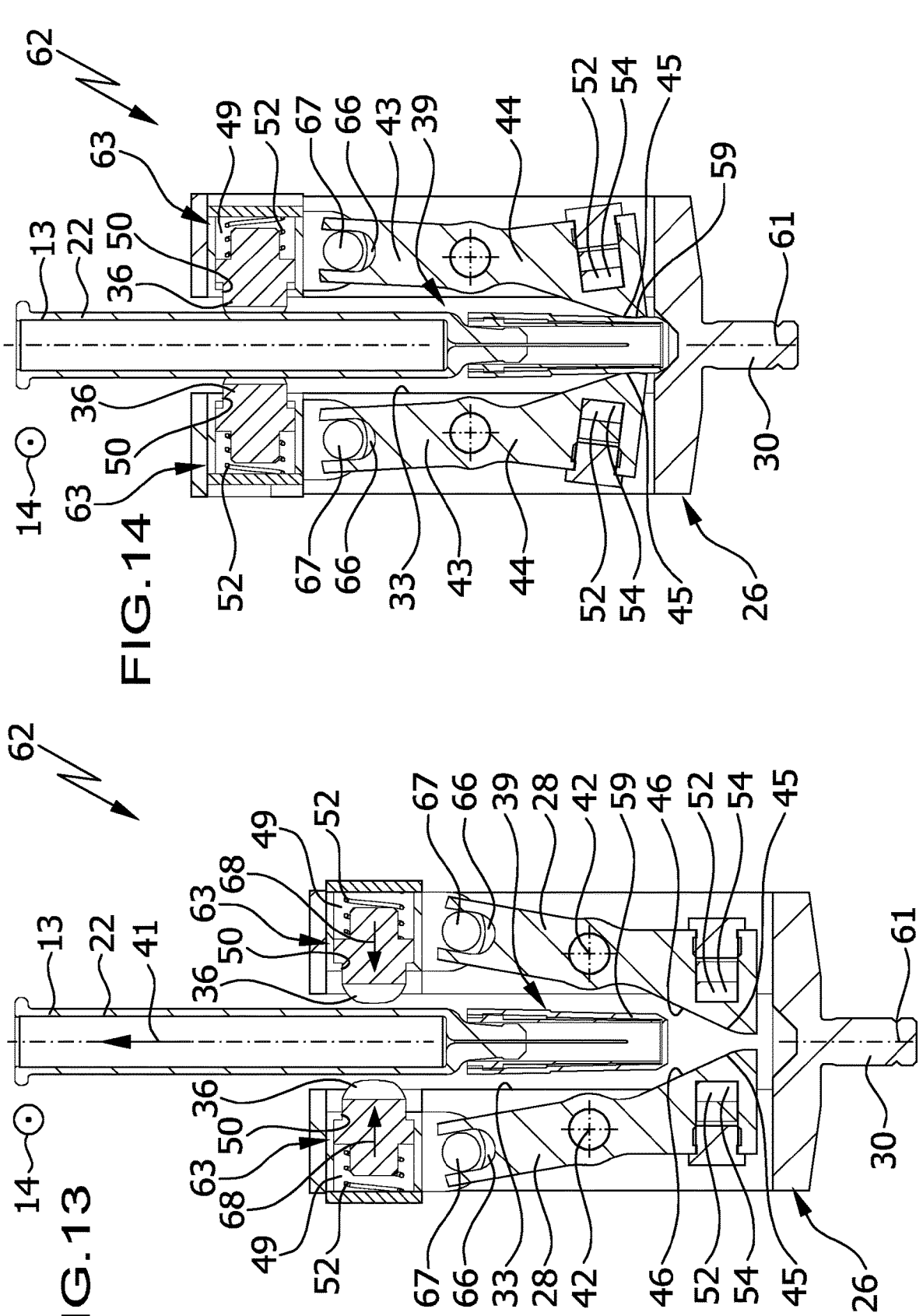
FIGS. 13 and 14: are views according to FIGS. 5 and 6, or 9 and 10, in the case of the container fixing device according to FIG. 11.

The receptacle body 63 can, for example, rest on shoulders of the holding segments 34 and be displaced thereon (FIG. 12).

The fixing element 28 comprises a pivot portion 65 for pivotable mounting on the holding portion 31. The pivot portion 65 is coupled to the receptacle body 63 via a joint. In the present case, an in particular slot-shaped receptacle 66 is formed distally, with respect to the base portion 69, on the pivot portion 65. A bearing element 67, configured as a pin, of the receptacle body 63 engages in the receptacle 66. It is understood that the receptacle 66 and the bearing element 67 could also be transposed.

When the pivot portion 65 is pivoted, the receptacle body 63 is displaced together with the fixing member 36 in the direction of the container 13. The arrow 68 in FIG. 13 identifies the, in this respect, direction of displacement. The matching of the relative position of the receptacle body 63 and of the pivot portion 65 takes place by a movement of the bearing element 67 in the receptacle 66. If the fixing element 28 is pivoted in the opposite direction, in order to be transferred from the fixing position into the release position, the receptacle body 63 is displaced away from the container 13 in the opposite displacement direction.

It is understood that the container fixing device 60 or the container fixing device 62, instead of and/or in addition to the container fixing device 25, can be part of the weighing station 18 and the apparatus 10.

Figure 15:
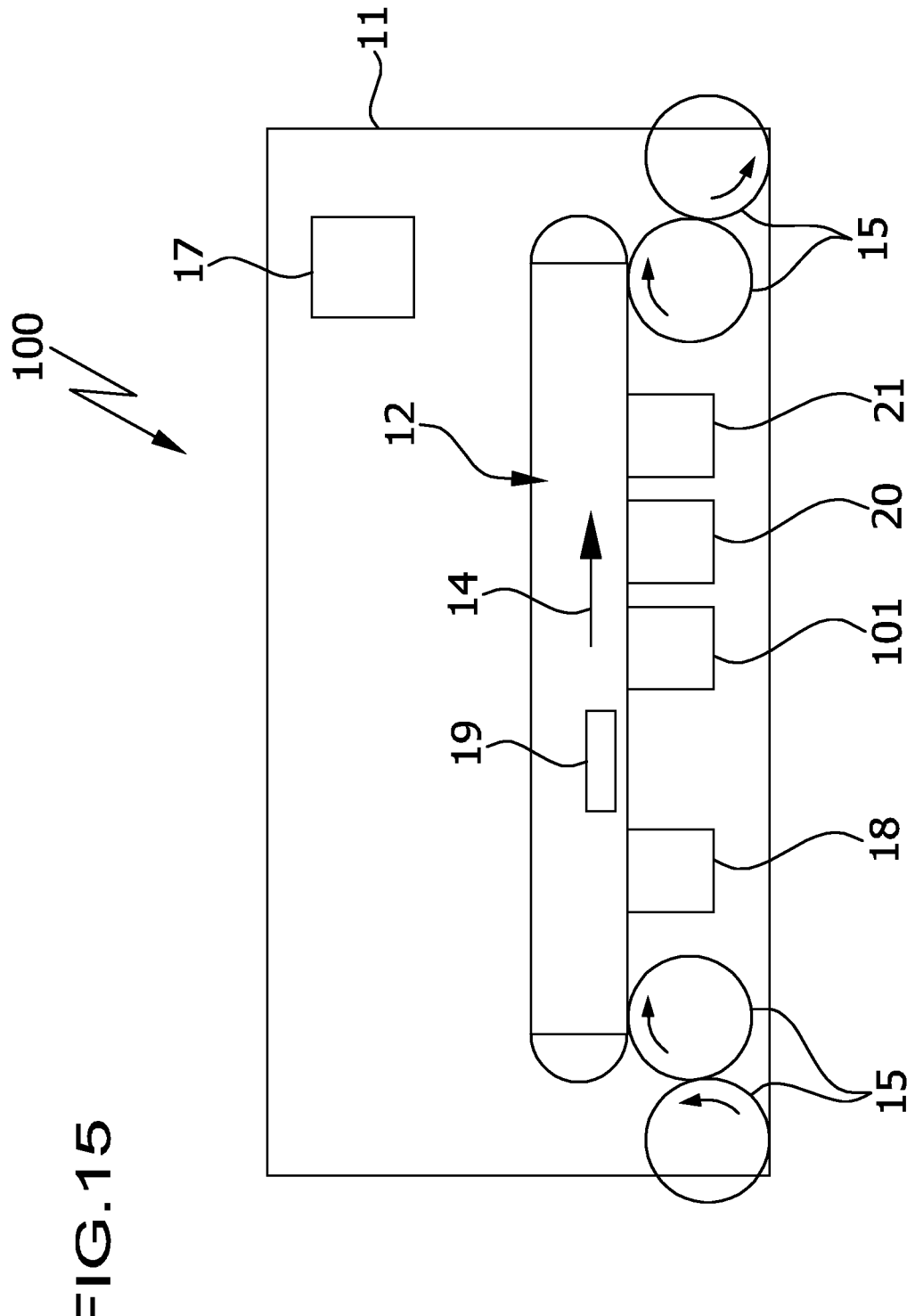
FIG. 15: is a view corresponding to FIG. 1 in the case of a further preferred embodiment of the apparatus in accordance with the disclosure for processing pharmaceutical containers.

FIG. 15 shows an advantageous embodiment, designated by the reference numeral 100, of the apparatus in accordance with the disclosure for processing pharmaceutical containers. Identical reference numerals are used for identical or like-acting features and components of the apparatuses 10 and 100.

In the case of the apparatus 100, two weighing stations 18 and 101 arranged one behind the other in the transport direction 14 are provided, which are preferably configured identically. With regard to the weighing station 18, reference is made to the above statements. The tare weight of the unfilled containers 13 is determined by means of the weighing station 18. The gross weight of the filled containers 13 is determined by means of the weighting station 101.

The filling station 19 is arranged between the weighing stations 18, 101. It is preferably possible to fill the containers 13 during transport from the weighing station 18 to the weighing station 101. If necessary, refilling can preferably be done while the containers 13 are held on the weighing station 101.

The invention claimed is:

1. A container fixing device for pharmaceutical containers for use on a weighing station, comprising a main body for connection to or as a component of a weighing cell of the weighing station, two or more fixing elements, which are fixed on the main body, having at least one respective fixing member, which is adapted to be placed onto the container, between which a interspace for receiving a container is formed, and of which at least one fixing element is movably arranged on the main body, wherein a container arranged in the interspace comes into contact with an actuating member of the at least one movable fixing element in the case of a relative movement with respect to the main body in an actuation direction, and the at least one movable fixing element is transferable from a release position, in which the container is insertable into the interspace and is removable therefrom, into a fixing position in which the container is fixed by means of the two or more fixing members, wherein the container fixing device is designed such that the container is insertable into the interspace in a transport direction which is oriented transversely to the actuation direction, and wherein, on the main body, at least one through-opening is formed, through which the container is introducible into the interspace in the transport direction.

2. The container fixing device according to claim 1, wherein the container fixing device comprises only one movable fixing element.

3. The container fixing device according to claim 1, wherein the container fixing device comprises at least one immovable fixing element.

4. The container fixing device according to claim 1, wherein the container fixing device comprises a movable fixing element and an immovable fixing element, or wherein the container fixing device comprises two movable fixing elements.

5. The container fixing device according to claim 1, wherein the container is movable out of the interspace in the transport direction, and the container being adapted to pass through the container fixing device in the transport direction.

6. The container fixing device according to claim 1, wherein, on the main body, two through-openings are formed, through which the container is introducible into and removable from the interspace.

7. The container fixing device according to claim 1, wherein the main body comprises two or more holding portions which are each arranged at a distance from one another and on which a fixing element is arranged in each case.

8. The container fixing device according to claim 7, wherein the main body comprises a, base portion, from which the holding portions protrude, and/or on which a connecting element is arranged for connecting to a weighing cell.

9. The container fixing device according to claim 1, wherein the at least one movable fixing element is mounted on the main body so as to be pivotable about a pivot axis, wherein the transport direction is oriented in parallel with the pivot axis.

10. The container fixing device according to claim 9, wherein the at least one movable fixing element forms a two-armed lever which comprises a first lever arm comprising the fixing member and a second lever arm comprising the actuating member.

11. The container fixing device according to claim 1, wherein the container rests on the actuating member in the fixing position of the at least one movable fixing element.

12. The container fixing device according to claim 1, wherein the main body comprises a recess in which the container engages, in the state fixed by means of the container fixing device.

13. The container fixing device according to claim 12, wherein the container engages in the recess in a positive-locking manner in the state fixed by means of the container fixing device.

14. The container fixing device according to claim 1, wherein the fixing member of at least one fixing element comprises a concave recess matched to a shape and/or a size of the container, in which the container engages in the fixing position of the at least one movable fixing element.

15. The container fixing device according to claim 1, wherein the fixing member of at least one fixing element is, by means of a preloading element, preloaded in toward the container arranged in the interspace.

16. The container fixing device according to claim 15, wherein a receptacle for the fixing member is formed on the fixing element, or wherein the fixing element comprises a receptacle in which the fixing member and the preloading element are arranged and which forms a guide for the fixing member, wherein the fixing member engages through an opening of the receptacle and projects toward the container.

17. The container fixing device according to claim 16. wherein the fixing element has a receptacle body which comprises or forms the receptacle and is displaceably guided on a holding portion of the main body and is coupled to a pivot portion, which is pivotably mounted on the holding portion, of the fixing element and, in the case of pivoting of the pivot portion, is displaced thereby relative to the main body.

18. The container fixing device according to claim 1, wherein the at least one movable fixing element is automatically transferred from the fixing position into the release position during a relative movement of the container and the main body counter to the actuation direction.

19. The container fixing device according to claim 1, wherein the container fixing device comprises interacting coupling elements at two or more fixing elements in each case, in order to couple the fixing elements to one another in the release position, in a contactless manner, wherein the fixing elements are transferred from the release position into the fixing position counter to the action of the coupling elements.

20. The container fixing device according to claim 1, wherein the transport direction is oriented perpendicularly to the actuation direction.

21. An apparatus for processing pharmaceutical containers, the apparatus comprising:

at least one weighing station; and a transport device, the at least one weighing station comprising:

at least one weighing cell; and at least one container fixing device, the at least one container fixing device comprising a main body for connection to or as a component of the at least one weighing cell and two or more fixing elements, the two or more fixing elements being fixed on the main body, each fixing element having at least one fixing member, which is adapted to be placed onto each pharmaceutical container, the two or more fixing elements forming one or more interspaces between the two or more fixing elements for receiving each pharmaceutical container, at least one of the fixing elements being a movable fixing element movably arranged on the main body, wherein each pharmaceutical container arranged in one of the one or more interspaces comes into contact with the movable fixing element during a relative movement with respect to the main body in an actuation direction, and the movable fixing element is transferable from a release position, in which each pharmaceutical container is insertable into one of the one or more interspaces and is removable from said one of the one or more interspaces, into a fixing position in which each pharmaceutical container is fixed by the fixing members, wherein the at least one container fixing device is designed such that each pharmaceutical container is insertable into one of the one or more interspaces in a transport direction which is oriented transversely to the actuation direction, wherein the containers are each held on the transport device with at least one gripping element and are transportable in a cycled manner in a transport direction, and the at least one weighing station is arranged at the transport device, wherein each container is movable in the transport direction into the interspace of a container fixing device, and wherein the at least one weighing station and the container are transferable relative to one another in the actuation direction for transferring the at least one movable fixing element from the release position into the fixing position.

22. The apparatus according to claim 21, wherein the at least one weighing cell comprises a plurality of weighing cells, the at least one container fixing device comprises a plurality of container fixing devices, and each weighing cell is associated with one of the container fixing devices.

23. The apparatus according to claim 21, wherein the at least one gripping element gripping the container is transferable into an open position releasing the container when the container is fixed to the container fixing device.

24. The apparatus according to claim 21, wherein the at least one weighing cell comprises a plurality of weighing cells and the at least one container fixing device comprises a plurality of container fixing devices along the transport direction, and wherein a corresponding plurality of pharmaceutical containers are supplied in a cycled manner to the plurality of container fixing devices and are weighed simultaneously at the weighing station.

25. A container fixing device for pharmaceutical containers for use on a weighing station, comprising a main body for connection to or as a component of a weighing cell of the weighing station, two or more fixing elements, which are fixed on the main body, having at least one respective fixing member, which is adapted to be placed onto the container, between which a interspace for receiving a container is formed, and of which at least one fixing element is movably arranged on the main body, wherein a container arranged in the interspace comes into contact with an actuating member of the at least one movable fixing element in the case of a relative movement with respect to the main body in an actuation direction, the at least one movable fixing element being transferable from a release position, in which the container is insertable into the interspace and is removable therefrom, into a fixing position in which the container is fixed by means of the two or more fixing members, wherein the container fixing device is designed such that the container is insertable into the interspace in a transport direction which is oriented transversely to the actuation direction, and wherein the main body comprises a recess in which the container engages, in the state fixed by means of the container fixing device.

* * * * *